United States Patent

Mao et al.

Patent Number: 5,846,024
Date of Patent: Dec. 8, 1998

[54] LANDFILL SYSTEM AND METHOD FOR CONSTRUCTING A LANDFILL SYSTEM

[76] Inventors: James Mao, 26 Glen Rd., Westbury, N.Y. 11590; James Robert Franklin, 14804 FM 148, Scurry, Tex. 75158; Chi Ray Chen, 69-43 181st St., Fresh Meadows, N.Y. 11365

[21] Appl. No.: 778,806

[22] Filed: Jan. 3, 1997

[51] Int. Cl.⁶ .................. A62D 3/00; B09B 1/00
[52] U.S. Cl. .................. 405/129; 210/170; 210/747; 210/901; 405/128; 405/270
[58] Field of Search .................. 405/128, 129, 405/263, 270; 210/170, 747, 901

[56] References Cited

U.S. PATENT DOCUMENTS

| | | | |
|---|---|---|---|
| 3,732,697 | 5/1973 | Dickson | 405/129 |
| 4,473,477 | 9/1984 | Beall | 210/747 X |
| 4,592,846 | 6/1986 | Metzger et a. | 210/747 |
| 4,624,604 | 11/1986 | Wagner et al. | 405/128 |
| 4,844,813 | 7/1989 | Helfgott et al. | 210/747 |
| 4,908,129 | 3/1990 | Finsterwalder et al. | 405/129 X |
| 5,591,118 | 1/1997 | Bierck | 210/170 X |
| 5,605,417 | 2/1997 | Englert et al. | 405/129 |
| 5,733,453 | 3/1998 | DeBusk | 210/170 X |

*Primary Examiner*—George A. Suchfield
*Attorney, Agent, or Firm*—Clement J. Vicari

[57] ABSTRACT

A landfill system having a waste pit with a base portion. The base portion is covered with a liquid impermeable sheet and there is disposed at least one filtration zone below the base portion. Waste water is prevented from entering the natural substrate and the water table before it is directed through the filtration zone wherein the waste water is treated to remove contaminants prior to entering the natural substrate. Also included is a method for constructing a landfill system wherein a waste pit is cleared of debris and a liquid impermeable sheet is disposed on the base portion. In the base portion a filtration system is installed to capture waste water prior to entry into the natural substrate.

22 Claims, 2 Drawing Sheets

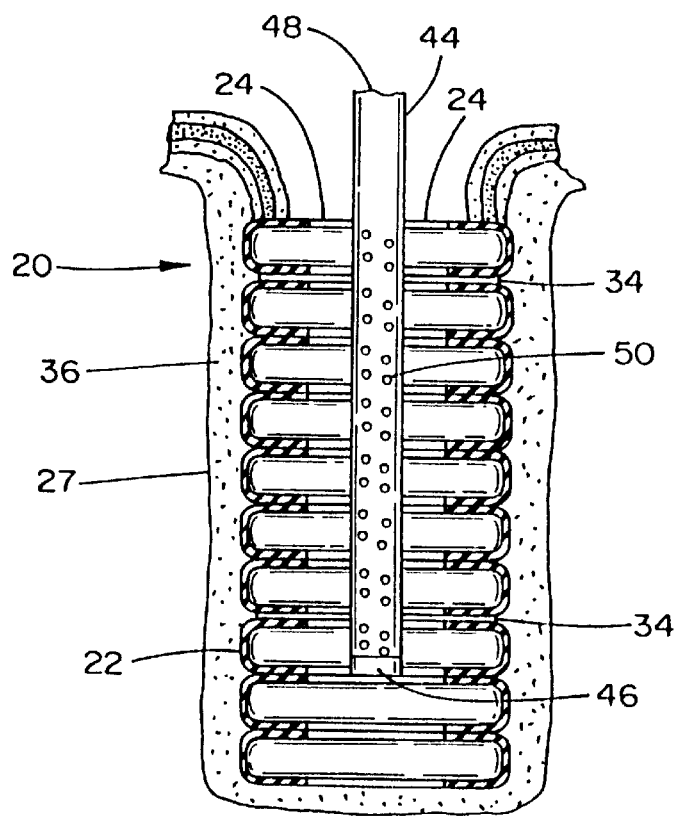
FIG.2
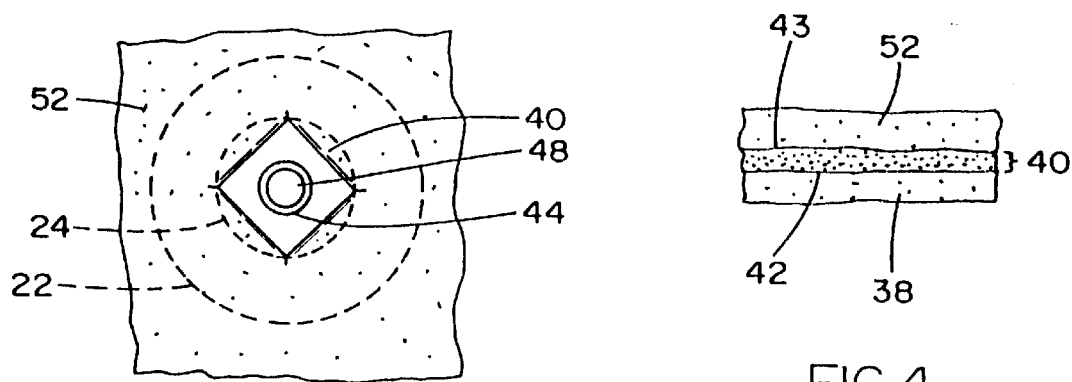
FIG.3
FIG.4

LANDFILL SYSTEM AND METHOD FOR CONSTRUCTING A LANDFILL SYSTEM

BACKGROUND OF THE INVENTION

The present invention relates to a novel landfill system and to a method for constructing landfills.

BACKGROUND OF THE PRIOR ART

At present, landfill systems are being subjected to increased attacks by environmentalists who are concerned with safety and health considerations and with contamination of water tables disposed beneath the landfill systems.

In the past, most solid waste was disposed of by providing a large pit into which the solid waste was deposited. This large pit was generally located near the site of solid waste generation. The partially filled or completely filled pits were then set on fire to reduce any combustible materials.

Unfortunately, this technique was not entirely satisfactory, since rainwater could cause any contaminants to be carried away along with the rainwater into the underground water tables resulting in contamination of the water beneath the landfill.

In view of the hazzards involved in practicing this prior art technique, those skilled in the art developed sanitary landfills in which the waste materials were reduced in size to a fraction of their original volume. The reduced size waste materials were then treated (depending on the type of waste material) and then deposited into areas that were later covered with earth. Although this technique did overcome some of the disadvantages of the prior art, it was and still is not an environmentally acceptable process, since there still remained contaminants which could be "rain swept" into the underlying water tables.

More recently, in an attempt to alleviate the problems incident to "rain swept" contaminants entering the soil, the art has resorted to the placement of plastic liners and compacted clay in waste pits, which, it was suggested, would reduce the leakage of rainwater containing toxic chemicals into the soil and ultimately the water table beneath the landfill.

This technique, of course, presented other problems, since pockets of contaminated water became "trapped" in the landfill and, in effect, had no where to go.

Accordingly, it is a principal object of the present invention to provide a landfill system wherein contaminated water which is present in the landfill is directed through a filtration zone to remove selected contaminants from the water.

A further object is to provide a landfill system wherein contaminated water present in the landfill is prevented from entering a water table prior to treating the contaminated water to remove contaiminated materials therefrom.

Another object of the present invention is to provide a landfill site wherein a filtration zone is disposed within the landfill site to decontaminate waste water present in the landfill site.

Still another object of the present invention is to provide a method for fabricating a landfill site wherein waste water from landfills is decontaminated prior to entering a water table.

These and other objects will become apparent from the following description of the invention.

SUMMARY OF THE INVENTION

Broadly contemplated, the present invention provides a landfill system comprising:

(1) a waste deposite pit including a base;

(2) at least one filtration zone disposed below said base;

(3) a shaft having an outlet and an inlet, said outlet communicating with said filtration zone, said inlet providing access for introducing liquid feed materials through said shaft into said filtration zone;

(4) a layer of compacted material disposed over said base;

(5) a liquid impermeable sheet disposed over said layer of compacted material, said liquid impermeable sheet including a membrane, said membrane being treated to render said membrane liquid impermeable to provide said liquid impermeable sheet, and (6) a cushioning material disposed over said liquid impermeable sheet, said compacted material, liquid impermeable sheet and cushioning material defining a common opening to permit passage therethrough of said shaft and waste water into said filtration zone.

The present invention also provides a method for constructing landfills which comprises:

(1) providing a waste deposit pit for depositing waste materials therein said waste deposit pit defining a base;

(2) cleaning and removing undesirable materials from said base;

(3) installing at least one filtration zone below said base;

(4) forming a layer of compacted material over said base;

(5) providing a membrane over said layer of compacted material;

(6) treating said membrane to render said membrane liquid impermeable to form a liquid impermeable sheet;

(7) providing a shaft having an outlet and an inlet, said outlet communicating with said filtration zone, said inlet providing access for introducing liquid feed materials through said shaft into said filtration zone, and (8) providing a cushioning material over said liquid impermeable sheet, said compacted material, liquid impermeable sheet and cushioning material defining a common opening to permit passage of waste water and said shaft into said filtration zone.

BRIEF DESCRIPTION OF THE DRAWINGS

FIG. 2 is a cross-sectional view of the typical filtration zone indicated in FIG. 1.

FIG. 3 is a plan view looking down on the uppermost portion of the filtration zone.

FIG. 4 is a slightly enlarged cross sectional view taken along the lines 4—4 of FIG. 1.

DETAILED DESCRIPTION OF THE INVENTION

Figure 1:
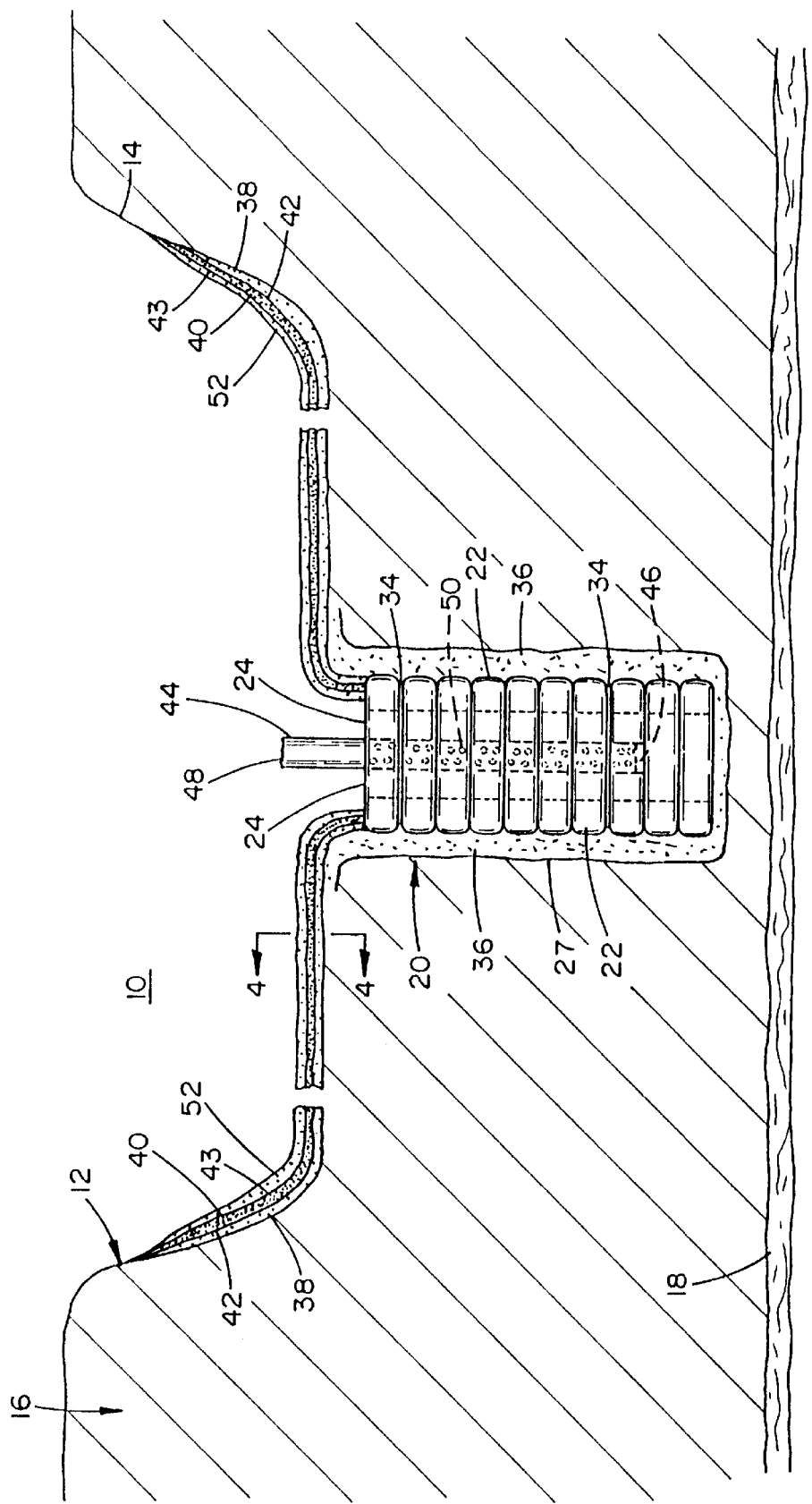
FIG. 1 is a side view of a typical selected landfill site showing a filtration zone at the base.

Selection of an appropriate landfill site depends, of course, on the land areas surrounding the proposed site. Appropriately, the proposed site is located a safe distance from areas of habitation. However, it should be remembered that opening landfills a long way from urban centers will significantly increase waste transportation costs. Accordingly, a proper balance must be achieved between the safety factors and the economical costs with priority, of course, extending to safety considerations. In addition, consideration should be given to the composition of the soil at, and proximate, the proposed site. After an appropriate site has ben selected, the site area is cleaned and, if necessary, slightly graded to the desired configuration of the landfill.

Referring to the drawings and particularly FIG. 1, it will be seen that there is illustrated a side view of a typical selected landsite 10 showing topographical features of the land and which includes waste pit 12. In general, the land site will be selected according to safety, health and economic considerations. The upper surface of waste pit 12 defines a base 14 which is generally the topsoil constituting the upper surface of the land. The land area under base 14 contains a natural substrate 16 which would be, for example, sand, clay, rocks and like materials. Disposed beneath natural substrate 16 is a water table 18 which can exist at various depths depending on the land characteristics.

The method for preparing the site according to the present invention can be practiced in portions of waste pit 12 as the need requires. For example, the method of the present invention can be practiced with portions of waste pit, i.e., those portions which are ready to receive the waste materials. It will be understood that as a portion of waste pit 12 is filled with waste material, the remaining portions of waste pit 12 can be progressively fabricated according to the present invention as the need requires.

An important feature of the present invention is the placement of filtration zones preferably in the areas consituting the lowest depression areas of waste pit 12.

Referring particularly to FIGS. 1 and 2, one such filtration zone is indicated for illustration purposes by sole reference numeral 20. The type and placement of the various filtration zones will depend upon the type of landfill and proposed contents of the landfill. In addition, these factors will also dictate the type of filtration medium utilized. Thus, in short, the lay of the land, the topography, and the contents of the landfill all determine the number of filtration zones, and the quantity and types of filtration medium utilized, their spacing and their placement in waste pit 12. Also significant in determining the placement of the filtration zone is the level of water table 18 which is spaced below the lower portion of the filtration zone. Basically, and as best seen in FIGS. 1 and 2, filtration zone 20 includes a container or housing which can accommodate the solid filter medium. The container or housing (shown in FIGS. 1 and 2 as tires 22) is disposed below base 14 and is disposed in an area in which soil has been removed to define a cavity 27 which accommodates the housing or container. The type of containers or housing utilized is one which provides strength, durability and which will not deteriorate over long periods of time. Examples of suitable housing or containers include rubber tires and cylindrical, rectangular or squarelike materials similar to rubber tires and which are substantially inert and which possess the necessary strength.

According to the present invention, and referring again to FIGS. 1 and 2, the housing or containers are preferably discarded rubber automobile tires indicated by reference numeral 22. At least two tires 22 are superimposed one over the other as shown in FIGS. 1 and 2 until they form a cylindrical configuration defining a central opening 24 extending vertically through superimposed tires 22. The number of tires utilized can be easily determined by one skilled in the art and depends in part on the quantity of solid filtration medium desired. The solid filtration medium indicated generally by reference numeral 26 in FIG. 2, and its selection depends upon the type of contaminants which are to be removed from the waste water.

In general, in order to remove contaminants such as, oils, solvents and acids from the waste water, the following filtrations mediums can be utilized—lime, activated charcoal and sand. Liquid feed materials include microorganisms. The quantity and type of filtration medium utilized should be sufficient to adequately filter the waste water which passes through the filtration zone and depends upon such things as the number of tires necessary and the type of contaminants to be removed. The solid filtration medium is added to filtration zone 20 preferaly prior to clearing waste pit 12.

As will be seen in FIG. 2 and assuming activated charcoal, lime and sand are utilized as the solid filtration medium, tires 22 are positioned in cavity 27 in a predetermined manner which depends upon the solid filtration packing. At the base of cavity 27, two superimposed tires accommodate the lime filtration material identified by reference numeral 28 followed by placement of one or more superimposed tires which accommodate an activated charcoal filtration material indicated by reference numeral 30. The positioning of tires 22 is repeated depending on the desired filtration criteria and basically comprises a series of alternate tire placements including lime or activated charcoal as desired and as indicated.

It will be noted that the uppermost placed tire contains sand 32 as a filtration medium followed by, in descending order, tires containing activated charcoal and tires containing lime. At the point of tire placement where a filtration medium changes to an activated charcoal filtration medium there is disposed a filtration sheet 34, which serves to prevent any other type of filtration medium from entering the charcol filtration medium. Filtration sheet 34 is preferably a polyester textile fabric having a weight of about 4 to 5 ounces per square foot. Other types of filtration sheets can be utilized which pass the necessary strength, flexibility and like characteristics. Other types of sheets would include, for example, nylon, fiber glass and similar synthetic fiber materials. Filtration sheet 34 preferably extends across the top of the tire or tires which accommodate the charcoal filtration medium.

Also disposed in cavity 27 on the outer periphery of tires 22 is a fine sand packing 36 which has a thickness of about 6 to 8 inches.

After installation of tires 22, and optionally the solid filtration mediums, waste pit 12 can be further treated.

Referring again to FIG. 1, base 14 is first cleared of any existing protruding debris such as heavy brush, rocks and any other undesirable material which, if permitted to remain, could cause subsequent problems in constructing the landfill system. If the soil over base 14 constitutes loosely compacted soil as the substrate, the soil must be rendered semi-hard, i.e., firmed up for the subsequent procedures which follow. This can be accomplished by adding a firming agent such as a calcium based product to the loosely compacted soil. A suitable calcium based product is lime, although other calcium based products can also be used. The purpose of adding the calcium based product or firming agent is to achieve a semi-hard substrate, substantially free of rocks, debris and other undesirable materials. In the event that the soil over base 14 is not suitable for use, sand can be superimposed over base 14 in which case the firming agent would also be required. Clay can also be employed over the surface of base 14 in which case the addition of a firming agent may not be necessary, although a firming agent can be employed if desired.

The material disposed over the upper portion of base 14 is then compacted by conventional techniques, such as by manual labor or by mechanical equipment, for example, by roller compacting. The compacting procedure results in a semi-hard substrate of compacted material 38 having a depth of about 12 to 24 inches, preferably about 12 to 14 inches.

After the preparation of compacted material 38, the surface is given a final inspection to insure that the area is substantially free of any protruding substances which could subsequently damage liquid impermeable sheet 40 which is to be applied to the surface of compacted material 38.

Referring to FIGS. 1 and 4, a membrane as shown by reference numeral 42 is applied to the upper surface of compacted material 38. Membrane 42 can be of the type commonly used in fabricating waterproof roofing systems. The membrane selected can be of the type which is adapted to receive a coating on its surface resulting in a product having the requisite flexibility and strength.

Examples of suitable membranes include fibrous membranes such as fiber glass, polyester, nylon and like synthetic fibers which can be woven to provide a textile fabric having a weight of about 4 to 5 ounces per square foot. The preferred membrane is one which is formulated with polyester fibers having a weight of about 4.5 ounces per square yard. A preferred membrane is available commercially from a wide variety of sources and comes available in rolls which can be about 10 to 20 feet in width and about 400 feet in total length. Membranes containing polyester are particularly suitable because of their strength, durability and because they can conform readily to land surface irregularities.

When applying membrane 42 to the surface, it is best to determine whether there is no rain forcasted for about 12 hours. The working surface should be completely dry. Starting at the desired point which is determined by the surrounding area, a ply of polyester membrane is installed over the desired surface. The polyester membrane 42 is worked flat onto the desired surface such as by a 2 inch bristle brush broom until the membrane surface is free of wrinkles. After the membrane is secured to the surface, it becomes ready for the application of the coating material indicated in FIGS. 1 and 4 by reference numeral 43. The coating material is preferably one which can be applied without the need for heating the material. Particularly suitable coating materials, are water based materials. Those coating materials which are employed in the roofing industry are particularly suitable. Suitable materials for the coating operation can be obtained from Envirotech Industries Inc., located at 94-20 West Lake Highland Drive, Dallas, Tex. 75218, under the general designation E-FLEX. Various types of E-FLEX materials are described in the publication "Enviroflex" Roofing System, dated February, 1996 and which is available from Envirotech Industries, Inc.

Advantageously, materials can be added to the water based coating materials which provides additional strength and flexibility. Some of these materials include powdered recycle tire rubber which can be added to, for example an asphalt emulsion polymerized with a neoprene latex. This addition would provide increased surface wearability and membrane thickness for years of service.

The coating can be applied by various techniques known to the art. Thus the coating can be sprayed onto the surface of membrane 42 or alternatively, the coating can be rolled or brushed onto the surface of the membrane until the membrane contains sufficient material to completely cover membrane 42. In general, enough coating material should be applied so as to provide a final liquid impermeable sheet having a mil thickness of about 3 mil thickness to about 100 mil thickness.

The process for applying the membrane and coating material is continued providing about six inch end overlaps and 4 inch side overlaps, until the resultant liquid impermeable sheet covers the entire surface desired. Generally after application of the coating material, it is permitted to cure for about 8 to 12 hours, depending upon the weather conditions.

Referring to FIG. 3 it will be seen that membrane 42 is initially applied over filtration zone 20 in a manner such as to provide access to central opening 24 of tires 22. Access can be provided by forming a slit in the lengthwise and widthwise direction in membrane 42 which covers the central opening 24 of tires 22 and thereafter folding down and tucking the cut edges of membrane 42 into central opening 24. This procedure permits access to the filtration zone while preventing waste water from entering the solid surrounding the filtration zone.

Referring to FIGS. 1, 2 and 3 it will be seen that there is shown an access means for feeding liquid feed materials such as microbe destroying agents into filtration zone 20. Liquid feed materials can be introduced into central opening 24 of tires 22 through feed shaft 44 disposed interiouly of tires 22. Shaft 44 should be of sufficient length to extend into the vertical height of tires 22 while providing access of feed materials to the filtration zone. As seen in FIG. 3, the base of shaft 44 terminates immediately above the surface of the lowermost placed tires and terminates with end cap 46 which seals the bottom opening of shaft 44.

Various types of materials constituting the shaft can be utilized. However, the preferred shafts are those which are fabricated from a plastic material such as polyvinyl chloride. Shaft 44 has a diameter of about 4 to 10 inches and preferably about 6 to 8 inches. Shaft 44 is provided with feed inlet 48 for introducing feed materials into the interior of tires 22. Shaft 44 is also provided with feed material outlets indicated by outlets or openings 50 disposed around the periphery of shaft 44 thereby permitting feed materials fed into feed inlet 48 to be discharged from shaft 44 through outlets 50 and into the filtration zone. The number of openings and their size depends upon the type of feed materials to be utilized. In general, the openings can be rectangular, squarelike, circular and like geometric configuration. Preferably openings are circular and can have a diameter of about 1.5 to 3 inches and preferably 2 inches. Advantageously, additional shafts can be secured in conventional manner to the top of shaft 44 as landfill progresses.

Referring again to FIGS. 1 and 4, it will be seen that a cushioning material 52 is added to the surface of impermeable sheet 40 which serves to prevent damage to the impermeable sheet. Although various types of cushioning materials are available for this purpose, economic considerations dictate the use of sand as the cushioning material because of its availability and cost. The sand can be spread out over all the horizontal surfaces over impermeable sheet 40 to a depth of about 12 to 14 inches. As mentioned previously, the entire landfill site need not be constructed but rather and preferably portions of the landsite are constructed as the needs require.

As is known, the deposit of waste materials in landfill sites leads to the generation of gases and normally gas vent pipes are installed at various locations. Although these pipes are not shown in the present invention, it will be understood that they can be utilized according to conventional procedures.

In a typical mode of operation and assuming an appropriate landfill site has been selected, the entire topographical features of the landsite are analyzed to determine the extent of cleaning required as well as the number of filtration zones which would be required. A first site for filling is selected and this area is then subjected to the cleaning procedure discussed previously. Thus the area is cleaned to expose the base of the waste pit and any heavy brush material, rocks or any other undesirable protrusions are removed which if left in place could cause tears in the impermeable sheet which is to be later installed. After determining the depth of the water table, and the filtration zone requirements, the land area which is to accommodate the filtration zones is excavated which is normally in the depressed areas. Rubber tires are thereafter place done over the other with the bottom tire resting on the bottom surface of the cavity resulting from the excavation. The tires prior to installation can be filled with filtration materials such as lime and charcoal and installed one over the other, or alternatively, the tires are positioned as described and then the solid filtration materials added. Polyester sheets are placed over the top of the tires which contain the activated charcoal. A quantity of sand surrounding the outer periphery of the tires is added so as to provide an area of sand measuring about 6 to 10 inches in width. After installation of one or more filtration zones in the wast pit, the area is then made ready for the installation of the liquid impermeable sheet. Assuming that the soil over the base constitutes loosely compacted soil, a sufficient quantity of lime is added to the soil in an amount sufficient to render the dirt semi-hard which is easily determined by feel. The treated soil is subjected to a roller compacting procedure to assume the necessary hardness and to achieve a smooth surface. A polyester membrane having a weight of about 4.5 ounces per square yard and which is provided in roll form having a width of about 20 feet and a length of about 360 feet is then superimposed over a desired area of the compacted material. If required, adhesion points can be provided which serves to hold the membrane in place. The membrane is then subjected to a coating operation such as a spraying operation utilizing as a coating material a water based material such as latex neoprene in an emulsion of powdered recycle tire rubber. The emulsion is applied in an amount such as to provide a finished coated product having a mil thickness of about 3 to 100 mil. At the site where the coated membrane covers the tires, the area over the tires is slit in a crosslike section over the horizontal section of the central opening of the tires, and the severed material is thereafter folded down into the central opening of the tires. Application of the membrane and coating material is continued providing about six inch overlaps and four inch side overlaps until the resultant liquid impermeable sheets covers the entire surface desired. The coating material is then permitted to cure for about 12 hours.

After curing the coating material, sand is applied over the cured material in areas where horizontal surfaces are present. A polyvinyl chloride shaft having a diameter of about 6 inches and which is provided with a system of circular openings is then placed into the tires as described previously.

The filling of the waste pit with garbage and like discarded materials can then commence and the contents of the filtration zone can be periodically examined in order to determine if any microbes are present. The filtration zone can then be treated in order to remove these microbes by feeding conventional microbe destroying agents into the shaft inlet and through the circular openings of the shaft into the filtration zone. As landfill progresses, additional shafts can be attached to shaft 44 and additional land can be treated by adding additional impermeable sheets as landfill progresses.

As will be evident from the above, the present invention provides a landfill system in which the disadvantages of the prior art, discussed previously, have been substantially eliminated. In view of the positioning of the impermeable sheet, waste water carrying contaminants are precluded from entering the natural substrate without entering the filtration zone.

In the filtration zone, the contaminants in the waste water are removed so that waste water entering the natural substrate is substantially free of any toxic materials and hence the clean waste water does not contaminate the water present in the water table. In addition any microbes present in the filtration zone can be effectively destroyed by adding conventional microbe destroying liquids into the filtration zone in any easy and efficient manner.

Although the invention has been illustrated by the preceding specifics employed therein, but rather the invention is directed to the generic area as hereinbefore disclosed. Various modifications and embodiments thereof can be made without departing from the spirit and scope thereof.

What is claimed is:

1. A landfill system comprising:
    (1) a waste deposit pit including a base;
    (2) at least one filtration zone disposed below said base;
    (3) a shaft having an outlet and an inlet, said outlet communicating with said filtration zone, said inlet providing access for introducing liquid feed materials through said shaft into said filtration zone;
    (4) a layer of compacted material disposed over said base;
    (5) a liquid impermeable sheet disposed over said layer of compacted material, said liquid impermeable sheet including a membrane, said membrane being treated to render said membrane liquid impermeable to provide said liquid impermeable sheet, and
    (6) a cushioning material disposed over said liquid impermeable sheet, said compacted material, liquid impermeable sheet and cushioning material defining a common opening to permit passage therethrough of said shaft and waste water into said filtration zone.

2. A landfill system according to claim 1, wherein said filtration zone includes a housing which is adapted to contain solid filtration mediums.

3. A landfill system according to claim 2, wherein said housing is at least two rubber tires superimposed one over the other to form a cylindrical configuration defining a central opening extending vertically through said superimposed tires.

4. A landfill system according to claim 2, wherein said filtration medium is lime or activated charcoal or sand.

5. A landfill system according to claim 4, wherein said lime or activated charcoal or sand are separately packed in said housing.

6. A landfill system according to claim 1, wherein said layer of compacted material is sand including a firming agent.

7. A landfill system according to claim 6, wherein said sand is compacted over said base to a height of about 12 to 24 inches.

8. A landfill system according to claim 1, wherein said membrane is a textile fabric having a weight of about 4 to 5 ounces per square yard.

9. A landfill system according to claim 8, wherein said membrane contains polyester fibers or fiber glass or nylon fibers.

10. A landfill system according to claim 1, wherein said liquid impermeable sheet includes a coating on said membrane, said coating including a water based material.

11. A landfill system according to claim 10, wherein said coating material includes powdered recycled tire rubber.

12. A landfill system according to claim 11, wherein said coating is about 3 ml to 100 ml thickness.

13. A landfill system according to claim 1, wherein said cushioning material is clay or sand.

14. A landfill system according to claim 1, wherein said outlet of said shaft is a system of openings disposed around the periphery of said shaft.

15. A landfill system according to claim 5, wherein a polyester textile fabric is disposed over said activated charcoal packed in said housing.

16. A landfill system comprising:
   (1) a waste deposit pit including a base;
   (2) at least one filtration zone disposed below said base, said filtration zone including a housing adapted to contain solid filtration mediums, said solid filtration mediums being lime or activated charcoal or sand and being separately packed in said housing;
   (3) a shaft having an outlet and an inlet, said outlet communicating with said filtration zone, said inlet providing access for introducing liquid feed materials through said shaft into said filtration zone, said outlet of said shaft being a system of openings disposed around the periphery of said shaft;
   (4) a layer of compacted sand or clay disposed over said base;
   (5) a liquid impermeable sheet disposed over said layer of compacted sand or clay, said liquid impermeable sheet including a textile fabric membrane, said membrane being coated with a water based material to render said membrane liquid impermeable to provide said liquid impermeable sheet, and
   (6) a sand or clay cushioning material disposed over said liquid impermeable sheet, said sand or cushioning material, liquid impermeable sheet and compacting material defining a common opening to permit passage therethrough of said shaft and waste water into said filtration zone.

17. A landfill system according to claim 16 wherein said coating includes powdered recycled tire rubber.

18. A landfill system according to claim 17 wherein said coating is about 3 mil to 100 mil thickness.

19. A landfill system according to claim 16 wherein said textile fabric membrane contains polyester or fiber glass or nylon fibers.

20. A landfill system according to claim 16 wherein said housing is at least two rubber tires superimposed one over the other to form a cylindrical configuration defining a central opening extending vertically through said superimposed tires.

21. A landfill system according to claim 16 wherein a polyester textile fabric is disposed over said activated charcoal packed in said housing.

22. A method for constructing landfills which comprises:
   (1) providing a waste deposit pit for depositing waste materials therein, said waste deposit pit defining a base;
   (2) cleaning and removing undesirable material from said base;
   (3) installing at least one filtration zone below said base;
   (4) forming a layer of compacted material over said base;
   (5) providing a membrane over said layer of compacted, material;
   (6) treating said membrane to render said membrane liquid impermeable to form a liquid impermeable sheet;
   (7) providing a shaft having an outlet and an inlet, said outlet communicating with said filtration zone, said inlet providing access for introducing liquid feed materials through said shaft into said filtration zone; and
   (8) providing a cushioning material over said liquid impermeable sheet, said compacted material, liquid impermeable sheet and cushioning material defining a common opening to permit passage of waste water and said shaft into said filtration zone.

* * * * *